Oct. 13, 1925.
C. D. SYMMS
1,556,648
LIGHT ABSORBING FILTER FOR AUTOMOBILES
Filed March 28, 1924
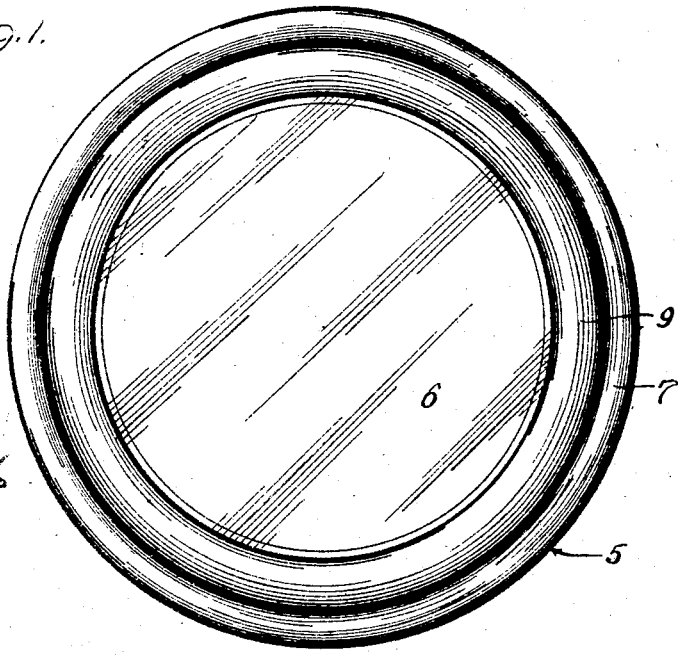
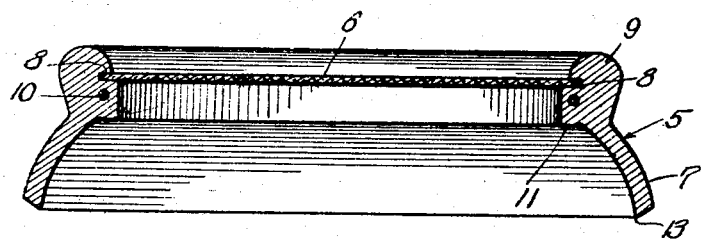
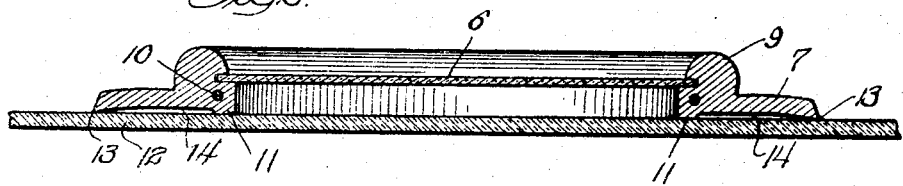
Inventor:
CHARLES D. SYMMS 1,556,648

UNITED STATES PATENT OFFICE.

CHARLES D. SYMMS, OF SIOUX FALLS, SOUTH DAKOTA, ASSIGNOR TO MABEL L. SYMMS, OF SIOUX FALLS, SOUTH DAKOTA.

LIGHT-ABSORBING FILTER FOR AUTOMOBILES.

Application filed March 28, 1924. Serial No. 702,521.

*To all whom it may concern:*

Be it known that I, CHARLES D. SYMMS, a citizen of the United States, residing at Sioux Falls, in the county of Minnehaha and State of South Dakota, have invented certain new and useful Improvements in Light-Absorbing Filters for Automobiles, of which the following is a specification.

This invention relates to improvements in light absorbing devices for automobiles, and has for its object to provide an improved construction of the same whereby it may be firmly supported by suction upon the windshield of the automobile and without placing any distortional strain upon the translucent medium forming the shield proper.

This object I accomplish in the manner and by the means hereinafter described and claimed, reference being had to the accompanying drawing, in which:—

Fig. 1 is a front elevation of the device.

Fig. 2 is a central diametric section.

Fig. 3 is a similar view showing the device applied to a wind shield.

In all the views the same reference characters indicate similar parts.

The device in its simplest form consists of a soft rubber ring 5 and a disk 6 of translucent, light absorbing or filtering material such, for example, as colored glass or the like. I have found from a practical application of an embodiment of my invention that a disk of red glass is amply opaque to satisfactorily protect the eyes and sufficiently transparent to permit objects to be observed when looking through it into fields less brilliantly lighted.

The device is held on the glass windshield by effect of external air pressure due to the tendency to form a vacuum under the skirt 7 of the ring 5.

The glass plate 6 is enclosed in a groove 8 made in the head 9. A relatively rigid ring 10 is molded in the head to prevent distortion of the groove 8 when the skirt 7 is flattened out, as shown in Fig. 3. The ring may be of any suitable material. A wire, cable or cord serves the purpose.

An annular bead 11 is formed inside the skirt 7 near the head 9. The function of this bead is apparent from an inspection of Fig. 3.

The device is to be applied to the glass 12 of a windshield. To make it adhere to the glass it is placed on the inner surface with the disk 6 parallel with the glass 12. Pressure is applied by one hand to push the disk as near the glass as may be, at the same time the skirt 11 is moved outwardly by the fingers of the other hand until it is nearly flat against the glass, see Fig. 3. This causes the outer edge 13 of the skirt and the bead 11 to contact the glass and the resiliency of the skirt tends to move away from the glass effect of which is to form a partial vacuum in the space 14 between the edge 13 and the bead 11, the result of which is the device is made to cleave to the glass by effect of atmospheric pressure.

If the bead 11 was not present the device would nevertheless cling to the glass, but the entire area under the disk 6 would be below atmospheric pressure in which event the integrity of the joint between the perimeter of the disk 6 and the head 9 must be maintained. When the annular space 14, only, becomes subatmospheric, said joint will be maintained with greater fidelity as there will be less likelihood of a leak.

The soft rubber frame about the glass disk protects it from liability of breakage in the event that it should become accidently detached from its position on the windshield.

The enclosed area of the glass shield 12, underlying the disk 6, is protected from formation of frost from the moisture within the car and therefore its transparent property remains unaffected.

Having described my invention what I claim as new and desire to secure by Letters Patent, is:—

1. A glare shield for automobiles, comprising a disk of translucent material, and an enclosing frame of yielding resilient material, said frame comprising an annular head within which the disk is held, and a skirt joining one edge of the head, curved outwardly and laterally from the head, and an annular bead inside the skirt where it joins the head for contact with a flat surface when the skirt has been flattened.

2. A device of the character described, comprising a disk, a frame of soft, yielding, resilient material in which the disk is secured, said frame comprising a head and an outwardly and laterally curved skirt, whereby to form a subatmospheric space about the disk between the edges of the skirt when the latter has been flattened against the glass of a windshield, and a rigid ring disposed in said frame beneath the edge of said disk.

In testimony whereof I hereunto set my hand.

CHARLES D. SYMMS.